(12) United States Patent
Dumont

(10) Patent No.: US 7,488,098 B2
(45) Date of Patent: Feb. 10, 2009

(54) LIGHT HOLDER

(76) Inventor: Gilles Dumont, 74 Des Ormes Ouest, St-Philippe de Laprairie, Qué. (CA) J5A 1X5

( * ) Notice: Subject to any disclaimer, the term of this patent is extended or adjusted under 35 U.S.C. 154(b) by 0 days.

(21) Appl. No.: 11/635,997

(22) Filed: Dec. 8, 2006

(65) Prior Publication Data

US 2007/0141912 A1    Jun. 21, 2007

(30) Foreign Application Priority Data

Dec. 9, 2005    (CA) .................................... 2529131

(51) Int. Cl.
*F21V 21/00* (2006.01)
(52) U.S. Cl. ...................... 362/429; 362/288
(58) Field of Classification Search ................. 362/288, 362/429, 274; D26/138
See application file for complete search history.

(56) References Cited

U.S. PATENT DOCUMENTS 5,597,234 A * 1/1997 Winkelhake ................. 362/364
5,967,650 A * 10/1999 Laughlin ..................... 362/396

* cited by examiner

*Primary Examiner*—Jong-Suk (James) Lee
*Assistant Examiner*—Robert May
(74) *Attorney, Agent, or Firm*—Eric Fincham

(57) ABSTRACT

A bulb holder which comprises a bulb socket and a housing, a ring member formed of a resilient material, the ring member having first and second ends biased away from each other to a position where the first and second ends are spaced apart, the ends being movable towards each other to thereby diminish the size of the ring, and first and second arms interconnecting the ring member and the socket housing. The bulb holder permits circulation of air throughout a transparent tube in which the bulb is mounted.

7 Claims, 3 Drawing Sheets

LIGHT HOLDER

FIELD OF THE INVENTION

The present invention relates to a light holder and more particularly, relates to a light holder suitable for use in a horticultural apparatus.

BACKGROUND OF THE INVENTION

The use of hydroponics for the growth of plants is well known in the art and many different types of systems have been proposed. Generally, with hydroponics, a non-soil medium is utilized and the plant gathers the required nutrients from a liquid to which the roots are exposed. The original arrangement was adapted from conventional growing systems wherein the plants grew from containers lying in a horizontal plane. Lights were generally suspended above the plants and containers. While this system functions well, a substantial amount of energy is required for the lighting and accordingly, the economic return can only be justified with relatively high value plants.

More recently, systems have been developed which utilize a drum carrying a non-soil medium in which the plants grow with the drum rotating about a light source thereby maintaining a substantially constant distance between the plants and light. Since the light is effective through the full 360° of rotation, less total wattage is required for a given number of plants. In such an arrangement, liquid is generally provided at a trough located at the bottom of the drum into which the plants or at least their root systems are immersed to thereby provide the required moisture and nutrients.

One problem which has been encountered in prior art rotating drum systems is the maintenance of correct light intensity. The light intensity is exponentially related to the distance between the plant and the light. As there must be sufficient room for the plants to grow, the light source must be a certain distance away from the plants. While this distance may be suitable when the plants are substantially fully grown, the light intensity may be insufficient for the plants when they are young.

In order to overcome the above, it would be desirable to provide for an arrangement wherein the lamps can be easily interchanged.

A further problem which arises is the heat developed by the lights. Since the bulb is typically incased in a tube, the heat build up is substantial and any mounting arrangement should provide for maximum ventilation through the tube.

SUMMARY OF THE INVENTION

It is therefore an object of the present invention to provide a bulb holder suitable for use in rotary plant growing systems wherein the bulb may be easily replaced.

It is a further object of the present invention to provide for a bulb holder for use in a rotary plant growing system wherein maximum ventilation is supplied to the bulb.

According to one aspect of the present invention, there is provided a bulb holder comprising, a bulb socket, a bulb socket housing, a ring member formed of a resilient material, the ring member having first and second ends, the first and second ends being biased away from each other to a position where the first and second ends are spaced apart, the first and second ends being movable towards each other to thereby diminish the size of the ring, and first and second arms interconnecting the ring member and the socket housing, the first and second arms being angled at an acute angle with respect to both the housing and the ring member.

According to a further aspect of the present invention, there is provided in a hydroponic rotary growing apparatus having a plurality of medium retaining members rotating about a light housed in a transparent tube, an improvement wherein the light is retained by a bulb holder, the bulb holder comprising a bulb socket, a bulb socket housing, a ring member formed of a resilient material, the ring member having first and second ends, the first and second ends being biased away from each other to a position where the first and second ends are spaced apart, the first and second ends being movable towards each other to thereby diminish the size of the ring, and first and second arms interconnecting the ring member and the socket housing, the first and second arms being angled at an acute angle with respect to both the housing and the ring member.

The bulb holder of the present invention may be utilized with many different horticultural rotary growing apparatuses. Thus, it may be used in an apparatus such as shown in copending U.S. patent application Ser. No. 10/797,806 filed Mar. 10, 2004, the teachings of which are incorporated herein by reference.

In the above referred to rotary growing apparatus, a wheel rotates about a central light and a plurality of medium receiving members are designed to receive a growing medium and a plant. The desired nutrients are provided by an injection of a liquid containing the nutrients.

The light source is mounted with in a transparent cylindrical member and must be retained therein. Since the bulb emits a substantial amount of heat, it is preferred that the smallest area possible is blocked off to thereby increase the circulation throughout the transparent tube.

The bulb holder of the present invention, as aforementioned, includes a circular ring of a resilient material such that the size of the ring can be varied. When exterior of the transparent tube, the ring will be larger thereon such that when it is compressed and inserted into the tube, the ring will exert an outward biasing force on the transparent tube such that the bulb and bulb holder are retained in position.

The bulb holder of the present invention may be made of any suitable material which has the desired resilient features and which is inert to the heat and humidity generated within such an apparatus. Thus, one could use specially reinforced plastics or suitable metallic material. Generally, it is preferred that an aluminum or a stainless steel be utilized.

The ring is preferably provided with gripping portions such that the size of the same can be varied. A convenient arrangement is for tab members to extend inwardly proximate the first and second ends of the ring members such that the fingers of the operator can grip the same and insert the bulb holder and bulb into the transparent tube at the desired position.

BRIEF DESCRIPTION OF THE DRAWINGS

Having thus generally described the invention, reference will be made to the accompanying drawings illustrating an embodiment thereof, in which.

DETAILED DESCRIPTION OF THE INVENTION

Figure 1:
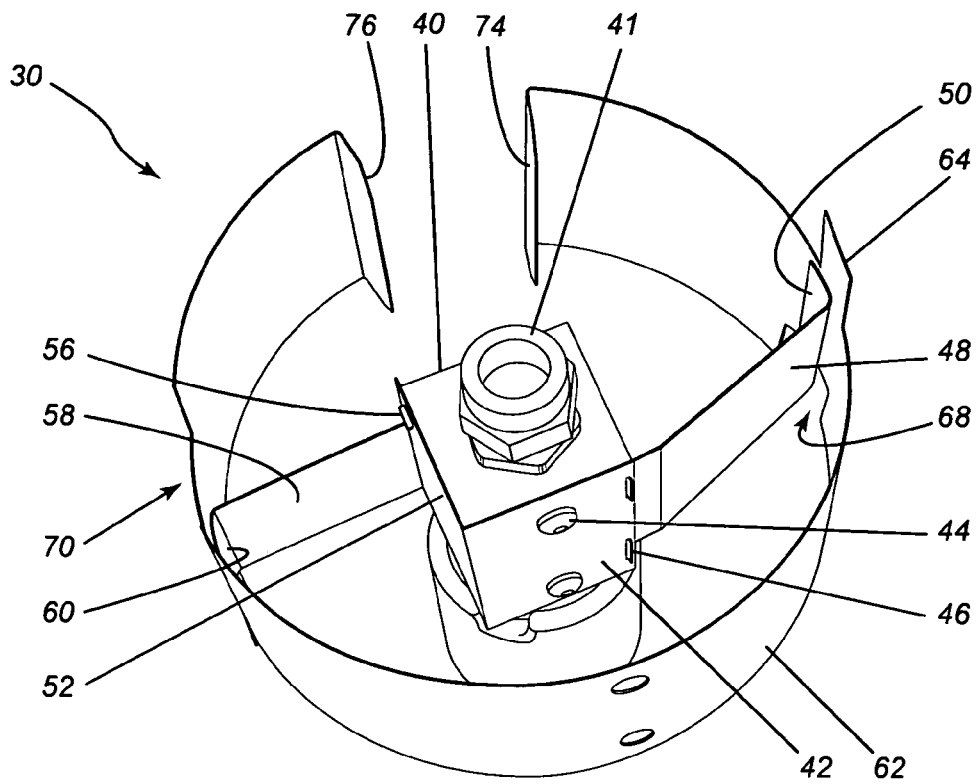
FIG. 1 is a perspective view of the lamp holder according to the prevent invention.
Figure 2:
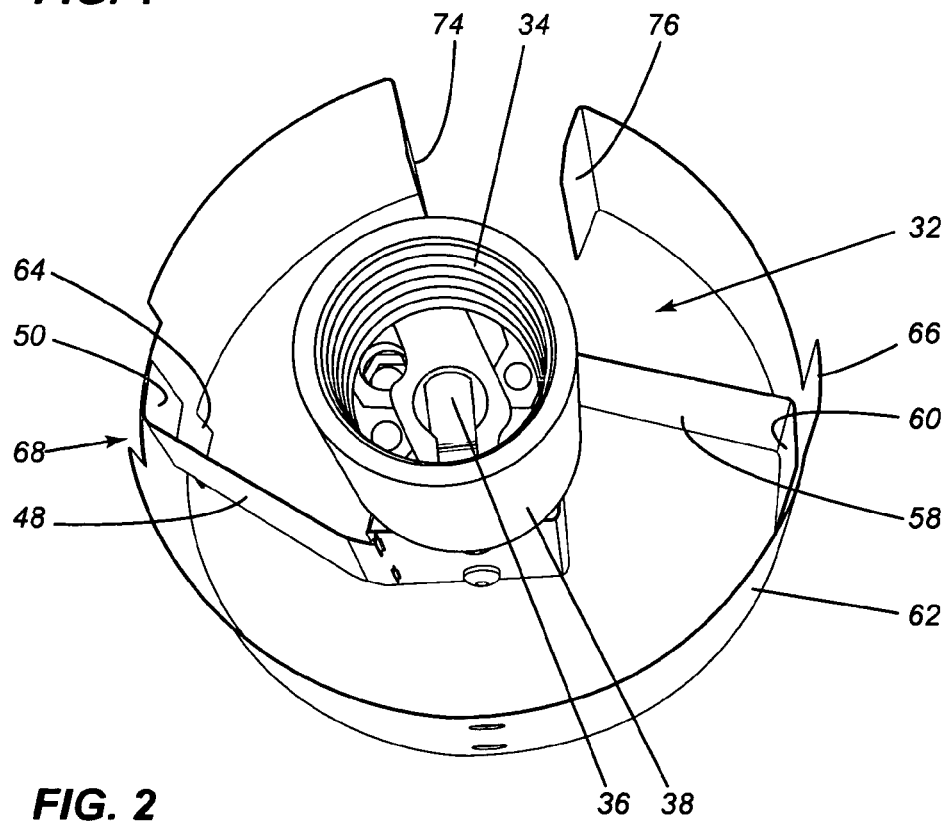
FIG. 2 is a view similar to FIG. 1 showing the lamp holder at a slightly different angle.
Figure 3:
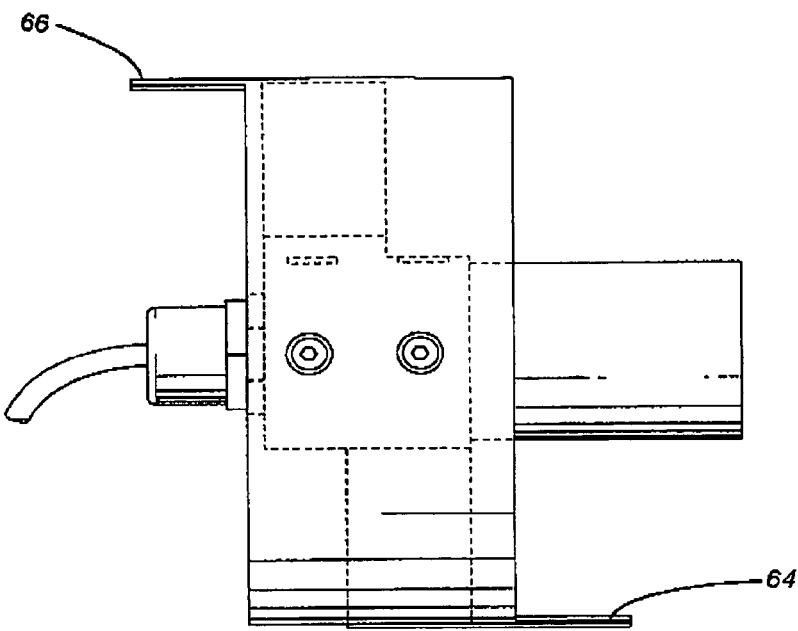
FIG. 3 is a side elevational view thereof.

Referring to the drawings in greater detail and by reference characters thereto, there is illustrated a hydroponic rotary growing apparatus which is generally designated by reference numeral 10.

Hydroponic rotary growing apparatus 10 includes a plurality of medium retaining members 12 which are attached to an extend about a rotating ring 14. On the back of medium containing members 12 there are provided slots 18 designed to receive water nutrients from injectors 16.

Mounted interiorly of ring 14 is a transparent tube 20 which houses a bulb 22. Bulb 22 is held by a lamp holder generally designated by reference numeral 30.

The lamp holder generally designated by reference numeral 30 includes a conventional socket portion 32 having threads 34 on the interior thereof to receive a threaded bulb. A bottom contact 36 is provided in the base of socket 32 to complete the electrical connection with the bulb bracket not shown. An outer housing 38 of socket 32 is connected to a lamp base portion generally designated by reference numeral 40. Lamp base portion 40 includes a grommet 41 to which the wires to socket 32 will pass.

A spring device generally designated by reference numeral 43 includes a first wall section 42 secured to lamp base portion 40 by means of screws 44 as well as engagement of tabs 46 from base portion 40. A first arm 48 extends outwardly from first wall section 42 and forms an acute angle with respect thereto. At the distal end of first arm 48, there is provided a flange 50.

There is also provided a second wall section 52 adjacent to first wall section 42 and which is retained in position by means of screws 54 screw threadedly engaged with lamp base portion 40. As with the first wall section there are provided tabs 56 which engage second wall section 52. A second arm 58 extends outwardly from second wall section 52 at an acute angle with respect thereto and terminates in a flange 60.

Extending substantially about housing 38 and base 40 is a ring 62. Ring 62 is formed of a sheet material and is of a resilient nature. Both first arm 48 and second arm 58 are suitably secured to the inner surface of ring 62 through flanges 50 and 60 by any suitable means such as adhesive, soldering, welding, etc. It will be noted that a stabilizing flange 64 extends outwardly from ring 62 adjacent flange 50 while a second stabilizing flange 66 extends outwardly in an opposite direction to stabilizing flange 64. Stabilizing flange 66 is located proximate flange 60 of second arm 58. It will also be seen that there are provided recesses or cutouts 68, 70 on the opposite sides of stabilizing flanges 64, 66.

Figure 4:
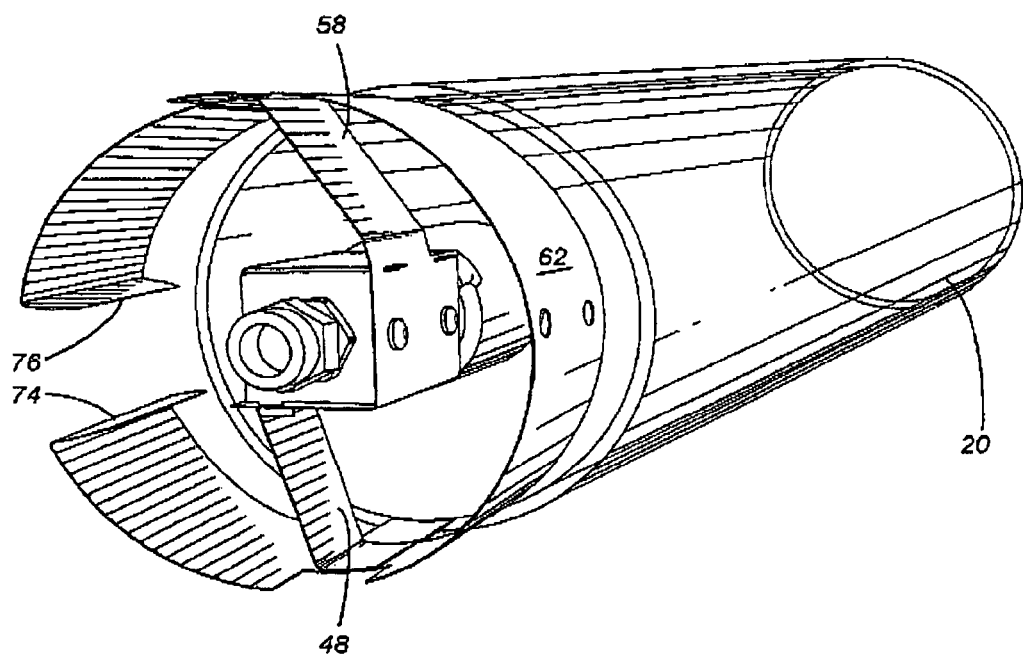
FIG. 4 is a perspective view of the lamp holder in a cylindrical tube.
Figure 5:
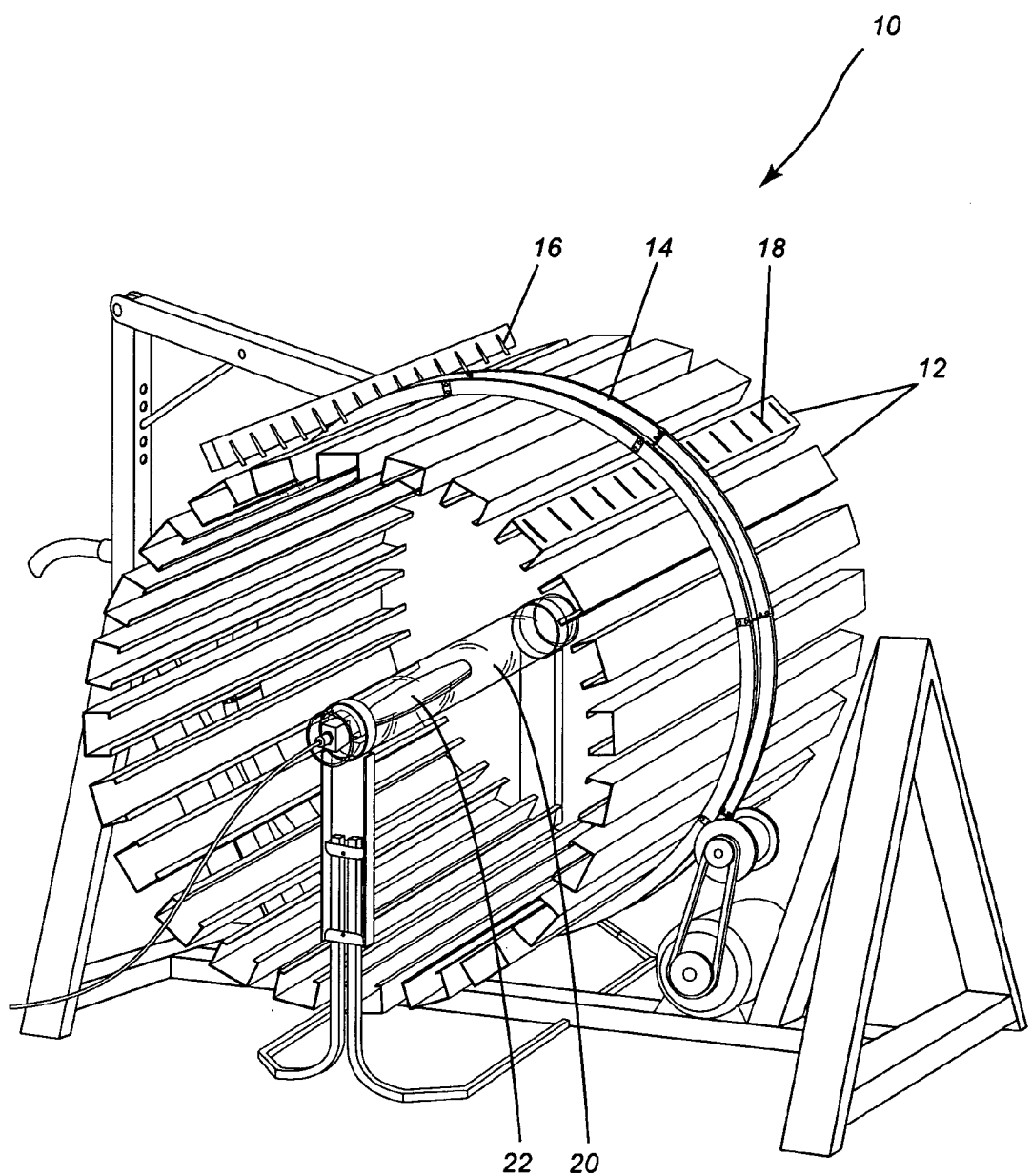
FIG. 5 is a perspective view of a horticultural rotary growing apparatus incorporating the lamp holder of the present invention.

As aforementioned, ring 62 is not completely closed an at the open ends are provided gripping portions or a handle 74 and 76. Handle 74 and 76 can be gripped to diminish the size of ring member 62 such that it will fit within transparent tube 20 as shown in FIG. 4.

It will be understood that the above described embodiments are for purposes of illustration only and that changes and modifications may be made thereto without departing from the spirit and scope of the invention.

I claim:

1. A bulb holder comprising:
    a bulb socket;
    a bulb socket housing;
    a ring member formed of a resilient sheet material, said ring member having first and second sides and first and second ends, said first and second ends being biased away from each other to a position where said first and second ends are spaced apart, said first and second ends being movable towards each other to thereby diminish the size of said ring;
    first and second arms interconnecting an interior surface of said ring member and said socket housing, said first and second arms being angled at an acute angle with respect to both said housing and said ring member, each of said first and second arms being formed of sheet material; and
    first and second stabilizing flanges each extending outwardly from a respective one of said first and second sides of said ring member, said first and second stabilizing flanges extending in opposite directions.

2. The bulb holder of claim 1 wherein said ring member and said first and second arms are formed of a sheet metal material.

3. The bulb holder of claim 2 wherein said ring member has gripping portions thereon to facilitate gripping by the hands of a user.

4. The bulb holder of claim 3 wherein said gripping portions comprise inwardly extending tabs located at said first and second ends.

5. The bulb holder of claim 2 wherein said rings and said arms are formed of a stainless steel material.

6. The bulb holder of claim 5 wherein said first and second arms are formed of a single piece of material, said first and second arms being connected to respective first and second wall sections, said first and second wall sections being secured to said socket housing.

7. A hydroponic rotary growing apparatus comprising a rotatable ring, a plurality of medium retaining members mounted on said ring, a light housed in a transparent tube located centrally of said rotatable ring, characterized in that said light is retained by a bulb holder, said bulb holder comprising:
    a bulb socket;
    a bulb socket housing;
    a ring member formed of a resilient sheet material, said ring member having first and second sides and first and second ends, said first and second ends being biased away from each other to a position where said first and second ends are spaced apart, said first and second ends being movable towards each other to thereby diminish the size of said ring; and
    first and second arms interconnecting an interior surface of said ring member and said bulb socket housing, said first and second arms being angled at an acute angle with respect to both said housing and said ring member;
    said ring member having first and second stabilizing flanges extending outwardly from a respective one of said first and second sides, said first and second stabilizing flanges extending in opposite directions.

* * * * *